(12) United States Patent
Zhang et al.

(10) Patent No.: US 11,264,933 B2
(45) Date of Patent: Mar. 1, 2022

(54) SENSORLESS CONTROL METHOD AND APPARATUS FOR A THREE-PHASE SWITCHED RELUCTANCE MOTOR

(71) Applicant: Hunan University of Science and Technology, Hunan (CN)

(72) Inventors: Xiaoping Zhang, Hunan (CN); Sijian Kuang, Hunan (CN); Ping Liu, Hunan (CN); Zhu Zhang, Hunan (CN); Haipeng Jiang, Hunan (CN); Shaowu Zhou, Hunan (CN)

(73) Assignee: Hunan University of Science and Technology, Xiangtan (CN)

( * ) Notice: Subject to any disclaimer, the term of this patent is extended or adjusted under 35 U.S.C. 154(b) by 0 days.

(21) Appl. No.: 17/163,980

(22) Filed: Feb. 1, 2021

(65) Prior Publication Data
US 2021/0159835 A1     May 27, 2021

Related U.S. Application Data

(63) Continuation of application No. PCT/CN2019/122280, filed on Nov. 30, 2019.

(51) Int. Cl.
*H02P 25/089* (2016.01)
(52) U.S. Cl.
CPC .................. *H02P 25/089* (2016.02)
(58) Field of Classification Search
CPC ......... H02P 25/089; H02P 21/18; H02P 21/24
See application file for complete search history.

(56) References Cited

U.S. PATENT DOCUMENTS

2004/0189240 A1    9/2004  Islam et al.
2015/0280626 A1*  10/2015  Ye .................. H02P 25/089
                                                    318/400.32
(Continued)

FOREIGN PATENT DOCUMENTS

CN     103270691 A     8/2013
CN     104467338 A     3/2015
(Continued)

OTHER PUBLICATIONS

Jun Cai, Zhiquan Deng Sensorless Control of Switched Reluctance Motors Based on Phase Inductance Model in Linear Regions Proceedings of the CSEE,vol. 32 No. 15,May 25, 2012.

*Primary Examiner* — Said Bouziane
(74) *Attorney, Agent, or Firm* — Wayne IP LLC

(57) ABSTRACT

A sensorless control method and an apparatus for a three-phase switched reluctance motor. The sensorless control method obtains line inductances of three phases according to real-time phase inductances of the three-phase switched reluctance motor and then determines feature points of the line inductances of the three phases. A position angle of the rotor at any time in the next corresponding region is calculated according to an average rotation speed of the rotor in the region corresponding to two adjacent feature points. A control signal is output to realize a precise sensorless control for the three-phase switched reluctance motor. The control apparatus includes a microcontroller, a power conversion circuit, a drive module for the power conversion circuit, a current detection module, a voltage detection module, an input and output module and a direct current regulated power supply.

10 Claims, 4 Drawing Sheets

(56) References Cited

U.S. PATENT DOCUMENTS

2018/0367078 A1* 12/2018 Creary ................ H02P 25/092
2019/0181788 A1*  6/2019 Koteich ................ H02P 21/18

FOREIGN PATENT DOCUMENTS

| CN | 105703680 A | 6/2016 |
| CN | 105897112 A | 8/2016 |
| CN | 109245633 A | 1/2019 |
| CN | 109495029 A | 3/2019 |
| WO | 2015199841 A1 | 12/2015 |

* cited by examiner

SENSORLESS CONTROL METHOD AND APPARATUS FOR A THREE-PHASE SWITCHED RELUCTANCE MOTOR

CROSS-REFERENCE TO RELATED APPLICATIONS

This application is a continuation of International Patent Application No. PCT/CN2019/122280, filed on Nov. 30, 2019, which claims the benefit of priority from Chinese Patent Application No. 201910076660.0, filed on Jan. 26, 2019. The content of the aforementioned applications, including any intervening amendments thereto, is incorporated herein by reference in its entirety.

TECHNICAL FIELD

The present disclosure relates to the control of switched reluctance motors, and more particularly to a sensorless control method and an apparatus for a three-phase switched reluctance motor.

BACKGROUND

Switched reluctance motors have small starting current, large starting torque and high efficiency. In addition, they have simple and firm structures, high fault tolerunsce and wide speed runsge, among other things. Therefore, the switched reluctance motors have been widely used in electric vehicles, aviation and mining. A real-time acquisition of the accurate position of the rotor is the key link to control the switched reluctance motors. A position sensor is typically used to obtain the rotor position information. However, the introduction of the position sensor increases the cost and complexity of speed control systems of the motors, but also reduce the system reliability and environmental adaptability. The sensorless control of the three-phase switched reluctance motor is of great importance.

The three-phase switched reluctance motors are the most widely used switched reluctance motors, and the sensorless control methods therefor include inductance model method, intelligent control method and flux linkage/current method. The inductance model method stores the inductances, currents and the corresponding rotor positions in a three-dimensional table in advance, and then collects the real-time currents and carries out simple calculations during the running of the motor is running, and the corresponding position angles of the rotor can be obtained according to the three-dimensional table. The algorithm of this method is simple; however, the methods consumes a large number of system resources and lacks in flexibility. The intelligent control method establishes a nonlinear-mapping model that inputs flux linkages and currents to output value of rotor positions in term of angle, and then estimate the position angles of the rotor through the model according to the real-time currents and flux linkages. This method provides high accuracy, but requires a complicated algorithm and large-scale computation, and the real-time acquisition of the rotor position is less preferred. The flux linkage/current method applies a chopping control current to the conducting phase of the switched reluctance motor and applies a high-frequency pulse to the non-conducting phase, and then estimate the rotor position according to the position angle of the intersection point of the conducting phase inductance and non-conducting phase inductance. This method consumes less system resources and needs medium-scale computation, but when the current of the conducting phase exceeds the critical saturation current, the position of the intersection points of the phase inductances will shift with the increase of the current of the conducting phase, and thus the estimation of the rotor position will have an offset, which is an obstacle to improve the control accuracy of the motor.

SUMMARY

Aiming at the above-mentioned problems in the prior art, the present disclosure provides a sensorless control method for a three-phase switched reluctance motor, which has a simple principle and consumes less system resources, and the algorithm thereof has a high accuracy.

In a first aspect, the present disclosure provides a sensorless control method for a three-phase switched reluctance motor, comprising:

S1) obtaining phase inductances according to real-time phase inductances of three-phase windings of the three-phase switched reluctance motor;

S2) dividing an electrical cycle of the three-phase switched reluctance motor into three conduction regions with a same electrical angle, and obtaining line inductances in a corresponding conduction region according to the phase inductances obtained in step S1 of the three-phase windings;

S3) determining feature points of line inductances of three phases according to the line inductances obtained in step S2; calculating a position angle and an time interval of a region corresponding to the feature points of two adjacent line inductances; and calculating an average rotation speed $\overline{\omega_n}$ of a rotor in the region corresponding to the feature points of the two adjacent line inductances according to the position angle and the time interval of the region;

S4) calculating a position angle $\theta_{n+1}(t)$ of the rotor at any time t in a next corresponding region according to the average rotation speed $\overline{\omega_n}$ of the rotor obtained in step S3 in the corresponding region; and S5) outputting a control signal to the three-phase switched reluctance motor according to the position angle of the rotor obtained in step S4, so as to realize a precise sensorless control for the three-phase switched reluctance motor.

In some embodiments, the step S1 comprises:

S11) operating the three-phase switched reluctance motor in a single-phase sequential cyclic conduction mode; controlling a power conversion circuit to inject a pulse voltage with a certain frequency into each phase winding; detecting a difference of a slope of a phase current and a direct-current bus voltage of each phase winding in real time; and calculating the inductance of each phase winding according to formula (1):

$$L = \frac{2u_{dc}}{\Delta i} \qquad (1)$$

wherein the $u_{dc}$ is the direct-current bus voltage; and the $\Delta i$ is the difference of the slope of the phase current between a turn-on and a turn-off of a switch tube;

S12) in an electrical cycle of a rotor of the three-phase switched reluctance motor, detecting a corresponding direct-current bus voltage and a difference of a slope of a phase current at different rotor position angles $\theta_k$ selected at a same time interval, respectively; calculating a corresponding inductance $L_k$ according to the formula (1) to obtain n groups of parameters $(\theta_k, L_k)$ (k=1, . . . n); according to the n groups of parameters, obtaining the phase inductions of the three-phase windings:

$$L_A(\theta_e)=B_1(i)+B_2(i)\cos\theta_e+B_3(i)\cos 2\theta_e \quad (2)$$

$$L_B(\theta_e)=B_1(i)+B_2(i)\cos(\theta_e-2\pi/3)+B_3(i)\cos 2(\theta_e-2\pi/3) \quad (3)$$

$$L_C(\theta_e)=B_1(i)+B_2(i)\cos(\theta_e+2\pi/3)+B_3(i)\cos 2(\theta_e+2\pi/3) \quad (4)$$

wherein $L_A(\theta_e)$, $L_B(\theta_e)$, $L_C(\theta_e)$ represent the phase inductances of A, B, and C phase windings of the three-phase switched reluctance motor, respectively; $\theta_e$ represents an electrical angle of the rotor; and $B_1(i)$, $B_2(i)$ and $B_3(i)$ represent coefficients of the phase inductances;

the above-mentioned coefficients $B_1(i)$, $B_2(i)$ and $B_3(i)$ can be uniformly expressed as:

$$B_j(i)=A_{j5}i^5+A_{j4}i^4+A_{j3}i^3+A_{j2}i^2+A_{j1}i+A_{j0} (j=1,2,3) \quad (5)$$

wherein Bj(i) represents a j-th coefficient of the phase inductance; i represents a current of the current phase winding; and $A_{j0} \sim A_{j5}$ represent coefficients of the Bj(i).

In some embodiments, in step S2, a difference between of phase inductances of two adjacent phase windings of a three-phase switched reluctance motor is defined as a line inductance of the two adjacent phase windings; and the line inductances corresponding to the three-phase switched reluctance motor are represented as follows:

$$L_{AB}(\theta_e)=L_A(\theta_e)-L_B(\theta_e) \quad (6)$$

$$L_{BC}(\theta_e)=L_B(\theta_e)-L_C(\theta_e) \quad (7)$$

$$L_{CA}(\theta_e)=L_C(\theta_e)-L_A(\theta_e) \quad (8)$$

wherein $L_{AB}(\theta_e)$ represents the line inductance between the A and B phase windings of the three-phase switched reluctance motor; $L_{BC}(\theta_e)$ represents the line inductance between the B and C phase windings; and $L_{CA}(\theta_e)$ represents the line inductance between the C and A phase windings.

In some embodiments, an electrical cycle of the three-phase switched reluctance motor is divided into three conduction regions with the same electrical angle:

(I) a first conduction region: the A phase is a conducting phase, and the B and C phases are non-conducting phases; and the line inductances of the three phases are represented as formulas (9)-(11):

$$L_{Ab}(\theta_e) = [B_1(I)-B_1(i)] + [B_2(I)\cos(\theta_e)-B_2(i)\cos(\theta_e-2\pi/3)] + [B_3(1)\cos2(\theta_e)-B_3(i)\cos2(\theta_e-2\pi/3)] \quad (9)$$

$$L_{bc}(\theta_e) = \sqrt{3}B_2(i)\cos(\theta_e-\pi/2) + \sqrt{3}B_3(i)\cos(2\theta_e+\pi/2) \quad (10)$$

$$L_{cA}(\theta_e) = [B_1(i)-B_1(I)] + [B_2(i)\cos(\theta_e+2\pi/3)-B_2(I)\cos(\theta_e)] + [B_3(i)\cos2(\theta_e+2\pi/3)-B_3(I)\cos2(\theta_e)]. \quad (11)$$

(II) a second conduction region, the B phase is a conducting phase, and the A and C phases are non-conducting phases; and the line inductances of the three phases are represented as formulas (12)-(14):

$$L_{aB}(\theta_e) = [B_1(I)-B_1(I)] + [B_2(i)\cos(\theta_e)-B_2(I)\cos(\theta_e-2\pi/3)] + [B_3(i)\cos2(\theta_e)-B_3(I)\cos2(\theta_e-2\pi/3)] \quad (12)$$

$$L_{Bc}(\theta_e) = [B_1(I)-B_1(I)] + [B_2(I)\cos(\theta_e-2\pi/3)-B_2(I)\cos(\theta_e+2\pi/3)] + [B_3(i)\cos2(\theta_e-2\pi/3)-B_3(I)\cos2(\theta_e-2\pi/3)] \quad (13)$$

$$L_{ca}(\theta_e) = \sqrt{3}B_2(i)\cos(\theta_e+5\pi/6) + \sqrt{3}B_3(i)\cos(2\theta_e-5\pi/6) \quad (14)$$

(III) a third conduction region, the C phase is a conducting phase, and the A and B phases are non-conducting phases; and the line inductances of the three phases are represented as formulas (15)-(17):

$$L_{ab}(\theta_e) = \sqrt{3}B_2(i)\cos(\theta_e+\pi/6) + \sqrt{3}B_3(i)\cos(2\theta_e-\pi/6) \quad (15)$$

$$L_{bC}(\theta_e) = [B_1(i)-B_1(I)] + [B_2(i)\cos(\theta_e-2\pi/3)-B_2(I)\cos(\theta_e+2\pi/3)] + [B_3(i)\cos2(\theta_e-2\pi/3)-B_3(I)\cos2(\theta_e+2\pi/3)] \quad (16)$$

$$L_{Ca}(\theta_e) = [B_1(I)-B_1(i)] + [B_2(I)\cos(\theta_e+2\pi/3)-B_2(i)\cos\theta_e] + [B_3(I)\cos2(\theta_e+2\pi/3)-B_3(i)\cos2\theta_e]; \quad (17)$$

according to the formulas (9)-(17), the following formulas can be obtained:

$$L_{AB}(\theta_e-2\pi/3)=L_{BC}(\theta_e) \quad (18)$$

$$L_{BC}(\theta_e-2\pi/3)=L_{CA}(\theta_e) \quad (19)$$

$$L_{CA}(\theta_e-2\pi/3)=L_{AB}(\theta_e) \quad (20);$$

as shown in formulas (18)-(20), the phase difference between any two adjacent line inductances is $2\pi/3$.

In some embodiments, the step S3 comprises:

S31) determining feature points of line inductance of the three phases;

wherein the feature point is defined as the position point of the rotor when the line inductances of the three phases are the same, that is, the position point $(\theta_k, L(\theta_k))$ formed by the position angle of the rotor when $L_{AB}(\theta)=L_{BC}(\theta)=L_{CA}(\theta)$; for the sake of convenience, intersection points of curves of the line inductances of the three phases are preferably selected as the feature points;

S32) calculating the position angle of a region corresponding to the feature points of two adjacent line inductances according to formula (21):

$$\Delta\theta_n = \frac{\Delta\theta_e}{N_r} \quad (21)$$

wherein $\Delta\theta_n$ represents the position angle of the region corresponding to the feature points of the two adjacent line inductances; $\Delta\theta_e$ represents the electrical angle of a region n corresponding to the feature points of the two adjacent line inductances; $N_r$ represents a number of a rotor pole of the three-phase switched reluctance motor;

S33) calculating an time interval of the region corresponding to the feature points of the two adjacent line inductances;

wherein inductances of the feature points of the line inductances are obtained according to the line inductances obtained in step S2 of the three phases through a microcontroller; a line inductance in real time is detected in the corresponding region n; when the line inductance is equal to the inductances of the feature points, a timer is reset and then started for timing, and inductances of next adjacent line inductances are detected at the same time; when the inductances of the next adjacent line inductances are equal to the inductances of the feature points, an time interval detected by the timer is recorded and saved; the time interval is the time interval $\Delta t_n$ of the region n corresponding to the two adjacent feature points; then the timer is reset and restarted for timing to measure the time interval of next region corresponding to adjacent line inductances; and the steps for obtaining the time interval of a region are repeated, so as to obtain all time intervals of regions corresponding to feature points of two adjacent line;

S34) calculating the average rotation speed $\overline{\omega}_n$ of the rotor in the region n corresponding to the feature points of the two adjacent line inductances according to formula (22):

$$\overline{\omega}_n = \frac{\Delta\theta_n}{\Delta t_n} \quad (22)$$

wherein $\Delta\theta_n$ represents the position angle of the region n corresponding to the feature points of the two adjacent line inductances; and $\Delta t_n$ represents the time for the rotor to rotate through the region n corresponding to the feature points of the two adjacent line inductances.

In some embodiments, in step S4, according to the average rotation speed $\overline{\omega}_n$ obtained in step S3 of the rotor in the region n, the position angle $\theta_{n+1}(t)$ of the rotor at any time t in the next corresponding region (n+1) is calculated by the following formula:

$$\theta_{n+1}(t)=\theta_{n+1}(t_0)+\overline{\omega}_n(t-t_0) \quad (23)$$

wherein $\theta_{n+1}(t)$ represents the position angle of the rotor at any time t in the region (n+1), and $\theta_{n+1}(t_0)$ represents the position angle of the rotor at a starting time $t_0$ of the region (n+1).

In a second aspect, the present invention provides a sensorless control apparatus for the three-phase switched reluctance motor, which comprises:
a microcontroller;
a power conversion circuit;
a drive module for the power conversion circuit;
a current detection module;
a voltage detection module;
an input and output module; and
a direct current regulated power supply;
wherein the microcontroller is connected to the drive module, the current detection module, the voltage detection module and the input and output module, respectively; the power conversion circuit is connected to the switched reluctance motor, the drive module, the current detection module and the voltage detection module;

the microcontroller is configured to send a control signal to the power conversion circuit through the drive module, and respectively output a chopping current and a high-frequency pulse to a conducting phase winding and a non-conducting phase winding of the three-phase switched reluctance motor through the power conversion circuit; the microcontroller is also configured to calculate the rotor position angle of the three-phase switched reluctance motor according to a feedback signal of voltage and current detected by the voltage detection module and the current detection module;

the drive module is configured to receive the control signal of pulse width modulation (PWM) output by the microcontroller, and output a corresponding control signal to control a switching state of a corresponding power switch in the power conversion circuit;

the current detection module is configured for real-time detection of a current of each phase of the three-phase switched reluctance motor in the power conversion circuit;

the voltage detection module is configured for real-time detection of a voltage of each phase of the three-phase switched reluctance motor in the power conversion circuit;

the power conversion circuit is configured to receive the control signal output by the power conversion circuit drive module, and output a chopping current to the conducting phase winding of the three switched reluctance motor and a high frequency pulse to the non-conducting phase winding, respectively;

the input and output module is configured to set control parameters of the three-phase switched reluctance motor and display state parameters such as speed and position angle of the rotor; and the direct current regulated power supply is configured to provide a voltage and a current to a system in normal operation.

The present disclosure provides a sensorless control method for a three-phase switched reluctance motor. The method calculates phase inductances of the three-phase winding of the three-phase switched reluctance motor in real time and obtains the phase inductances through numerical fitting. Then the line inductances are calculated according to the phase inductances. Feature points of two adjacent line inductances are determined, and then the position angle and time interval of the region corresponding to two adjacent feature points are obtained. An average rotation speed of a rotor in the region corresponding to the two adjacent feature points according to the obtained position angle and time interval. A position angle of the rotor at any time in the next corresponding region is calculated according to the average rotation speed, and a speed control for three-phase switched reluctance motor is realized without a position sensor according to the position angle. Compared to the flux linkage/current method which estimates the rotor position according to the position angle of the intersection point of phase inductances, this method estimates the rotor position according to the line inductance of the three-phase switched reluctance motor and avoids the problem relate to the saturation of phase current. Specifically, when the current of the conducting phase exceeds the critical, the position of the intersection points of the phase inductances will shift with the increase of the current of the conducting phase, and thus the estimation of the rotor position will have a deviation. Whereas the position angle between the two adjacent feature points corresponding to the line inductance obtained according to the phase inductance is fixed, and is independent of the saturation of phase current. The average rotation speed of the rotor in the region corresponding to the two adjacent feature points is calculated through obtaining the time interval between the feature points, and a position angle of the rotor at any time in the next corresponding region is calculated according to the average rotation speed, so as to realize an accurate speed control for the three-phase switched reluctance motor. This method improves the accuracy of the estimation of the rotor position, and realizes an accurate control for the three-phase switched reluctance motor without the position sensor. The influence of magnetic saturation on the estimation accuracy of the rotor position are effectively avoid, and the algorithm of this method is also simple. Based on these advantages, the control method provided herein has a great potential in the application.

DETAILED DESCRIPTION OF EMBODIMENTS

The embodiments of the present disclosure will be described with reference to the accompanying drawings. It should be noted that the embodiments provided herein are illustrative, and not intended to limit the scope of the present disclosure.

Embodiment 1

Figure 1:
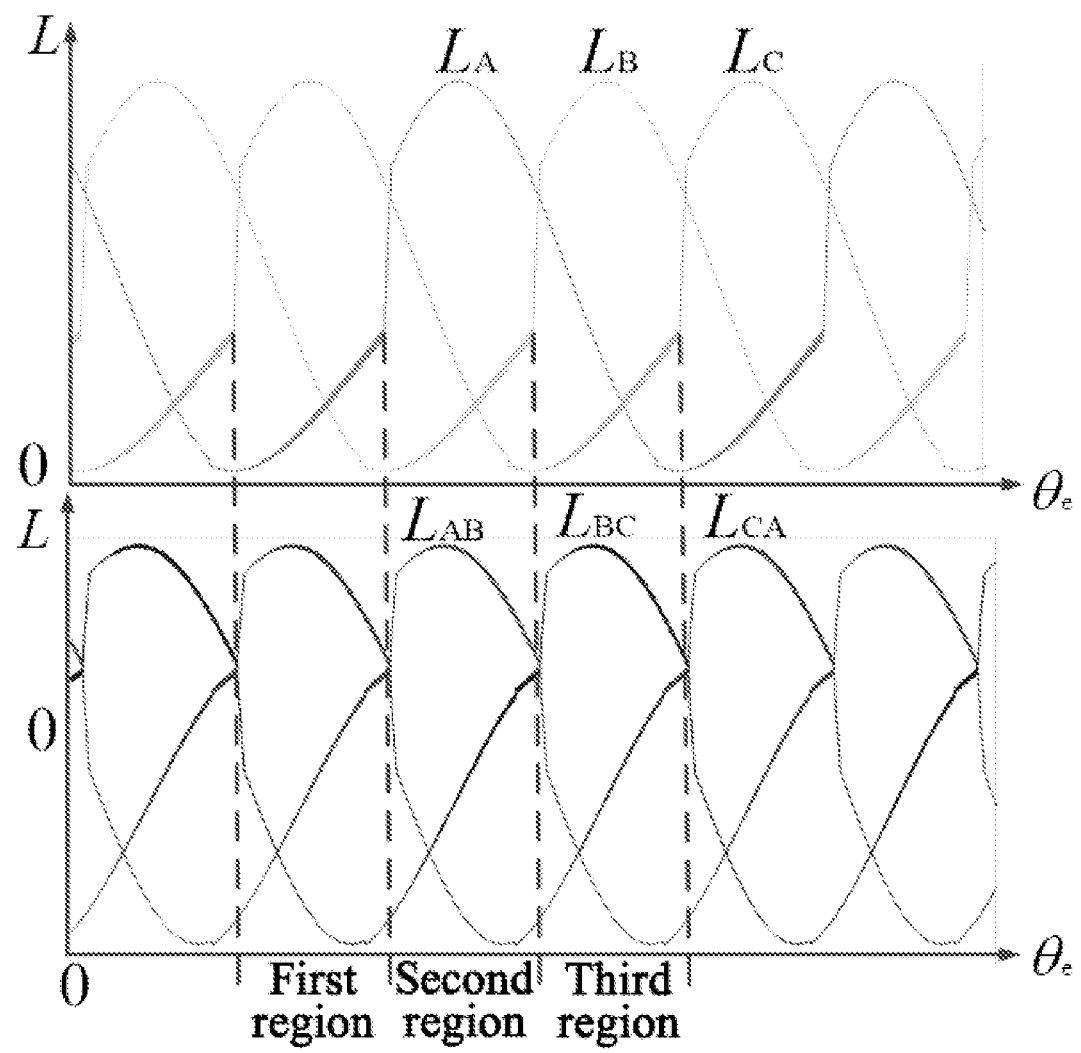
FIG. 1 is a curve diagram of phase inductances and line inductances of a three-phase switched reluctance motor in accordance with the present disclosure.

FIG. 1 is a curve diagram of phase inductances and line inductances of a three-phase switched reluctance motor of the present disclosure. In FIG. 1, an upper part is a phase inductance curve, and a lower part is a line inductance curve. In the phase inductance curve, a first conduction phase of three-phase switched reluctance motor in a cycle of a rotor is phase A, and a subsequent conduction phase is phase B and a final conduction phase is phase C.

According to a real-time detection of a difference of a slope of a phase current of each phase winding and a direct-current bus voltage, an inductance of each phase winding is calculated according to formula (1). Base on the inductance of each phase winding, a numerical fitting method is used to obtain phase inductances shown in formulas (2)-(4):

$$L = \frac{2u_{dc}}{\Delta i} \quad (1)$$

$$L_A(\theta_e) = B_1(i) + B_2(i)\cos\theta_e + B_3(i)\cos 2\theta_e \quad (2)$$

$$L_B(\theta_e) = B_1(i) + B_2(i)\cos(\theta_e - 2\pi/3) + B_3(i)\cos 2(\theta_e - 2\pi/3) \quad (3)$$

$$L_C(\theta_e) = B_1(i) + B_2(i)\cos(\theta_e + 2\pi/3) + B_3(i)\cos 2(\theta_e + 2\pi/3) \quad (4)$$

in the formulas, $L_A(\theta_e)$, $L_B(\theta_e)$, $L_C(\theta_e)$ represent the phase inductances of A, B, and C phase windings of the three-phase switched reluctance motor, respectively; $\theta_e$ represents an electrical angle of the rotor; and $B_1(i)$, $B_2(i)$ and $B_3(i)$ represent coefficients of the phase inductances.

The coefficients $B_1(i)$, $B_2(i)$ and $B_3(i)$ can be uniformly expressed as:

$$B_j(i) = A_{j5}i^5 + A_{j4}i^4 + A_{j3}i^3 + A_{j2}i^2 + A_{j1}i + A_{j0} \ (j=1,2,3) \quad (5)$$

in the formula, Bj(i) represents the j-th coefficient of the phase inductance; i represents a current of the current phase winding; and $A_{j0} \sim A_{j5}$ represent coefficients of the Bj(i).

Then, the line inductances are calculated according to the phase inductances by the following formulas:

$$L_{AB}(\theta_e) = L_A(\theta_e) - L_B(\theta_e) \quad (6)$$

$$L_{BC}(\theta_e) = L_B(\theta_e) - L_C(\theta_e) \quad (7)$$

$$L_{CA}(\theta_e) = L_C(\theta_e) - L_A(\theta_e) \quad (8)$$

in the formulas, $L_{AB}(\theta_e)$ represents the line inductance between the A and B phase windings of the three-phase switched reluctance motor; $L_{BC}(\theta_e)$ represents the line inductance between the B and C phase windings; and $L_{CA}(\theta_e)$ represents the line inductance between the C and A phase windings.

It should be noted that:

the three-phase switched reluctance motor is operated in a single-phase sequential cyclic conduction mode, that is, each phase of the three-phase switched reluctance motor is conducted at a same electrical angle in turns, and thus one electrical cycle can be divided into three conduction regions with the same electrical angle, in which the A phase is a conducting phase, and the B and C phases are non-conducting phases; the B phase is a conducting phase, and the A and C phases are non-conducting phases; and the C phase is a conducting phase, and the A and B phases are non-conducting phases.

Assuming that the three-phase switched reluctance motor runs under a certain load and stable speed, a current of the conducting phase current is I, and a current of the non-conducting phase is i, then the coefficients of the conducting phase inductances are $B_1(I)$, $B_2(I)$ and $B_3(I)$, and the coefficients the non-conducting phase inductances o are $B_1(i)$, $B_2(i)$ and $B_3(i)$. According to formulas (6)-(8), the line inductances shown in formulas (9)-(20) of the three-phase switched reluctance motor corresponding to the three regions in one electrical cycle are obtained. In order to distinguish the conducting phase from the non-conducting phase, the subscripts of the line inductances of the conducting phases are represented by capital letters whereas those of the non-conducting phases are represented by lowercase letters.

(I) In the first conduction region, the A phase is a conducting phase, and the B and C phases are non-conducting phases. The line inductances of the three phases are represented as formulas (9)-(11):

$$L_{Ab}(\theta_e) = [B_1(I) - B_1(i)] + [B_2(I)\cos(\theta_e) - B_2(i)\cos(\theta_e - 2\pi/3)] + [B_3(I)\cos 2(\theta_e) - B_3\cos 2(\theta_e - 2\pi/3)] \quad (9)$$

$$L_{bc}(\theta_e) = \sqrt{3} B_2(i)\cos(\theta_e - \pi/2) + \sqrt{3} B_3(i)\cos(2\theta_e + \pi/2) \quad (10)$$

$$L_{cA}(\theta_e) = [B_1(i) - B_1(I)] + [B_2(i)\cos(\theta_e + 2\pi/3) - B_2(I)\cos(\theta_e)] + [B_3(i)\cos 2(\theta_e + 2\pi/3) - B_3(I)\cos 2(\theta_e)]. \quad (11)$$

(II) In the second conduction region, the B phase is a conducting phase, and the A and C phases are non-conducting phases. The line inductances of the three phases are represented as formulas (12)-(14).

$$L_{aB}(\theta_e) = [B_1(i) - B_1(I)] + [B_2(i)\cos(\theta_e) - B_2(I)\cos(\theta_e - 2\pi/3)] + [B_3(i)\cos 2(\theta_e) - B_3(I)\cos 2(\theta_e - 2\pi/3)] \quad (12)$$

$$L_{bC}(\theta_e) = [B_1(I) - B_1(i)] + [B_2(I)\cos(\theta_e - 2\pi/3) - B_2(i)\cos(\theta_e + 2\pi/3)] + [B_3(I)\cos 2(\theta_e - 2\pi/3) - B_3(i)\cos 2(\theta_e + 2\pi/3)] \quad (13)$$

$$L_{ca}(\theta_e) = \sqrt{3} B_2(i)\cos(\theta_e + 5\pi/6) + \sqrt{3} B_3(i)\cos(2\theta_e - 5\pi/6) \quad (14)$$

(III) In the third conduction region, the C phase is a conducting phase, and the A and B phases are non-conducting phases. The line inductances of the three phases are represented as formulas (15)-(17):

$$L_{ab}(\theta_e) = \sqrt{3} B_2(i)\cos(\theta_e + \pi/6) + \sqrt{3} B_3(i)\cos(2\theta_e - \pi/6) \quad (15)$$

$$L_{bC}(\theta_e) = [B_1(i) - B_1(I)] + [B_2(i)\cos(\theta_e - 2\pi/3) - B_2(I)\cos(\theta_e + 2\pi/3)] + [B_3(i)\cos 2(\theta_e - 2\pi/3) - B_3(I)\cos 2(\theta_e + 2\pi/3)] \quad (16)$$

-continued $$L_{Ca}(\theta_e) = [B_1(I) - B_1(i)] + [B_2(I)\cos(\theta_e + 2\pi/3) - B_2(i)\cos\theta_e] + [B_3(I)\cos2(\theta_e + 2\pi/3) - B_3(i)\cos2\theta_e].$$  (17)

According to formulas (2)-(4) and formulas (9)-(17), curves of the phase inductances $L_A(\theta_e)$, $L_B(\theta_e)$ and $L_C(\theta_e)$ and the line inductances $L_{AB}(\theta_e)$, $L_{BC}(\theta_e)$ and $L_{CA}(\theta_e)$ of the three phases are obtained, as shown in FIG. 1.

It is shown that for each region, the corresponding curves of the phase inductance and line inductance are symmetrical. In addition, as shown in formulas (9)-(17), in one electrical cycle, the curve of the line inductance is composed of three segments. Taking $L_{AB}(\theta_e)$ for example, the curve of line inductances in one electrical cycle of $L_{AB}(\theta_e)$ is composed of three curves of the line inductances $L_{Ab}(\theta_e)$, $L_{aB}(\theta_e)$ and $L_{ab}(\theta_e)$ in above-mentioned three regions.

According to the formulas (9)-(17) and FIG. 1, the phase angle difference between two adjacent line inductances is $2\pi/3$, which is shown as follows:

$$L_{AB}(\theta_e - 2\pi/3) = L_{BC}(\theta_e)$$  (18)

$$L_{BC}(\theta_e - 2\pi/3) = L_{CA}(\theta_e)$$  (19)

$$L_{CA}(\theta_e - 2\pi/3) = L_{AB}(\theta_e)$$  (20)

that is, the phase angles that the line inductance $L_{BC}(\theta_e)$ lagged by $L_{AB}(\theta_e)$, $L_{CA}(\theta_e)$ lagged by $L_{BC}(\theta_e)$ and $L_{AB}(\theta_e)$ lagged by $L_{CA}(\theta_e)$ are $2\pi/3$. Therefore, for any two adjacent line inductances, the electrical angle of the region corresponding to any two position points with the same inductance is $2\pi/3$, and the electrical angle is irrelevant to the phase current and the coefficients $B_1(i)$, $B_2(i)$ and $B_3(i)$ of the phase inductances.

Assuming that the main technical parameters of a three-phase 6/4 structure switched reluctance motor are shown in Table 1, n sets of position angle and corresponding inductance parameter $(\theta_k, L_k)$ are obtained according to the technical parameters shown in Table 1, and then the corresponding phase inductance and coefficient Bj(i) thereof are obtained by means of least square method (Table 2).

TABLE 1

Parameters of the three-phase 6/4 structure switched reluctance motor

| Parameter | Value |
| --- | --- |
| Power rating/kW | 4 |
| Rated current/A | 16 |
| Rated torque/Nm | 32 |
| Resistance of phase winding/Ω | 3 |

TABLE 2

Coefficients of B$_j$(i) of the three-phase 6/4 structure switched reluctance motor

| j | A$_{j5}$ | A$_{j4}$ | A$_{j3}$ | A$_{j2}$ | A$_{j1}$ | A$_{j0}$ |
| --- | --- | --- | --- | --- | --- | --- |
| 1 | 6.35e−10 | −1.23e−7 | 8.84e−6 | −2.8e−4 | 2.8e−3 | 3.51e−2 |
| 2 | 6.69e−11 | −1.3e−8 | 9.19e−7 | −2.667e−5 | 1.415e−4 | 5.2e−3 |
| 3 | 1.24e−10 | −3.48e−8 | 3.28e−6 | −1.25e−4 | 1.2e−3 | 4.47e−2 |

As shown in formulas (18)-(20), the phase difference between any two adjacent line inductances is $2\pi/3$, that is, the difference of electrical angle $\Delta\theta_e$ between feature points of any two adjacent line inductances is $2\pi/3$. According to the conversion between the electrical angle and the position angle of the rotor:

$$\Delta\theta_n = \frac{\Delta\theta_e}{N_r}$$  (21)

the position angle of the region corresponding to the feature points of any two adjacent line inductances is:

$$\Delta\theta_n = \frac{2\pi}{3N_r}.$$

According to formula (21), as for the three-phase 12/8 structure switched reluctance motor, $N_r=8$. Therefore, the position angle of the region corresponding to the feature points of any two adjacent line inductances is $\Delta\theta_n=\pi/12$. As for the three-phase 6/4 structure switched reluctance motor, $N_r=4$. Therefore, the position angle of the region corresponding to the feature points of any two adjacent line inductances is $\Delta\theta_n=\pi/6$.

Figure 2:
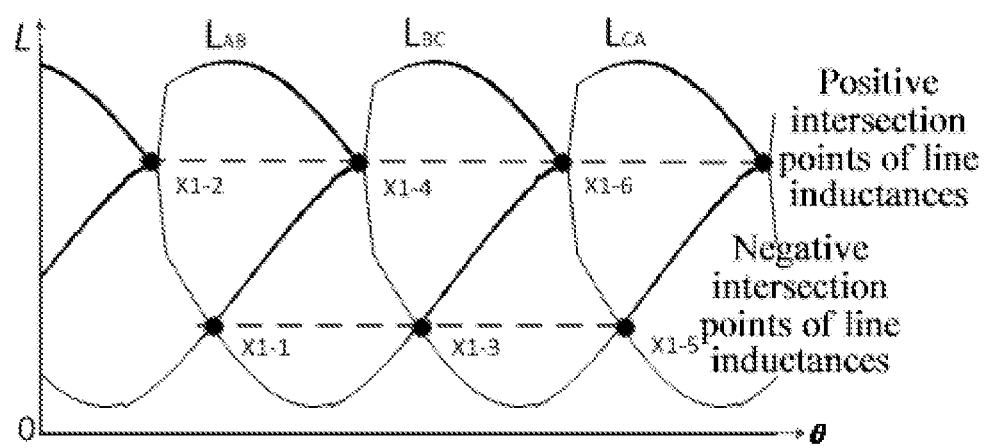
FIG. 2 is a schematic diagram of intersection points of line inductances of a three-phase switched reluctance motor in accordance with the present disclosure.

FIG. 2 is a schematic diagram of intersection points of line inductances of a three-phase switched reluctance motor in accordance with the present disclosure. When $L_{AB}(\theta)=L_{BC}(\theta)=L_{CA}(\theta)$, all the position points $(\theta_k, L(\theta_k))$ include the position angle $\theta_k$ of the rotor and the line inductance L are the feature points of line inductance. For the sake of convenience, the intersection points of line inductances are preferably selected as the feature points. The intersection points of line inductances included positive intersection points and negative intersection points. In the FIG. 2, the intersection points marked X1-2, X1-4, and X1-6 of line inductances are the positive intersection points, the intersection points marked X1-1, X1-3, and X1-5 of line inductances are the negative points. The method for judging the positive intersection points and the negative intersection points is: according to the line inductances obtained in step S2, it is judged whether any two line inductances at the same position angle are equal; if they are equal, then it is judged whether the line inductances are greater than 0; if they are greater than 0, the intersection points of the line inductances are the positive intersection points; otherwise, the intersection points of the line inductances are the intersection points.

Figure 3:
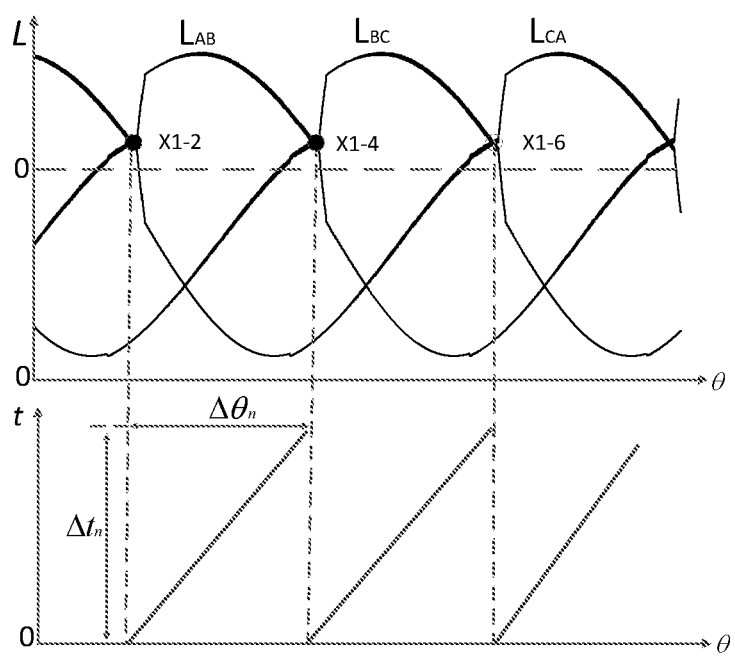
FIG. 3 is a schematic diagram of an time interval of a region obtained from intersection points of two adjacent line inductances in accordance with the present disclosure.

FIG. 3 is a schematic diagram of a time interval of a region obtained from intersection points of two adjacent line inductances in accordance with the present disclosure. The obtaining of the time interval of the region n from the positive intersection point X1-2 to X1-4 of the line inductances is taken as an example for description. When the microcontroller captured the positive intersection point X1-2, a timer is reset and then started for timing, and the next adjacent line inductances are detected at the same time. When the positive intersection point X1-4 of the adjacent line inductances occurs, the time interval $\Delta t_n$ detected by the timer is recorded and saved. The $\Delta t_n$ is the time interval of the region from the feature point X1-2 to the feature point X1-4 of the two adjacent line inductances. Then the timer is reset and restarted for timing, the next adjacent line inductances are detected until the feature point X1-6 appears, and then the timer records the time interval of the corresponding region. The steps for obtaining the time interval of a region are repeated, and in this way, all time intervals of regions of two adjacent line inductances are obtained.

For the three-phase 6/4 structure switched reluctance motor with $N_r=4$, the position angle of the intersection point of two adjacent lines is obtained according to formula (21):

$$\Delta\theta_n = \frac{\Delta\theta_e}{N_r} = \frac{2\pi}{3N_r} = \frac{2\pi}{3*4} = \frac{\pi}{6}(\text{rad})$$

Assuming that the time interval $\Delta t_n$ of the region corresponding to the intersection points of the two adjacent line inductances is 10 ms, an average rotate speed $\overline{\omega}$ of the rotor in the corresponding region is obtained according to formula (22):

$$\overline{\omega} = \frac{\Delta\theta_n}{\Delta t_n} = \frac{\pi}{6}/10^{-2} = 16.7\pi(\text{rad}/s)$$

Assuming that the position angle at the start time $t_0$ of the next corresponding region is $\pi/4$, the position angle of the rotor at any time in the next corresponding is calculated according to formula (23):

$$\theta_{n+1}(t) = \theta_{n+1}(t_0) + \overline{\omega_n}(t-t_0)$$
$$= \pi/4 + 16.7\pi * 3 * 10^{-3}$$
$$\approx 0.942(\text{rad})$$

Embodiment 2

Figure 4:
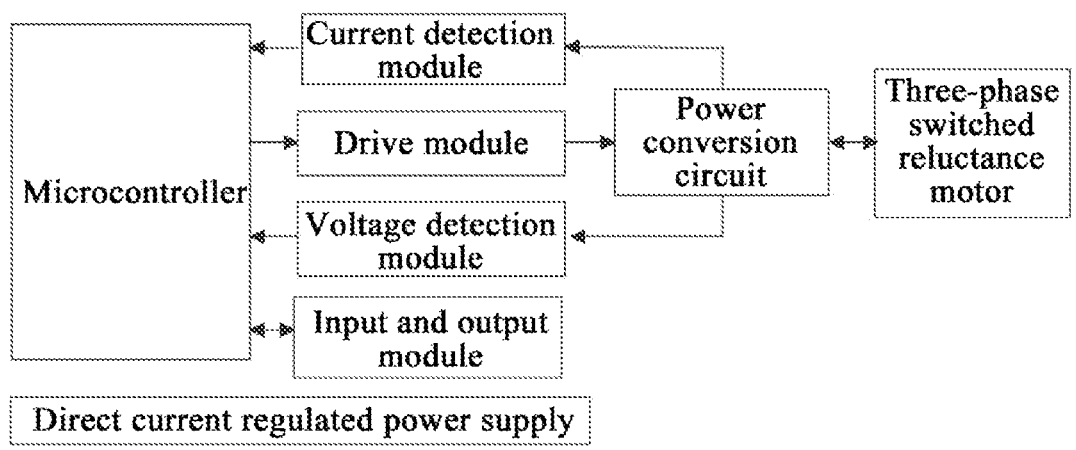
FIG. 4 is a block diagram of a sensorless control apparatus for a three-phase switched reluctance motor in accordance with the present disclosure.

FIG. 4 is a block diagram of a sensorless control apparatus of the present disclosure for a three-phase switched reluctance motor. The control apparatus includes: a microcontroller; a power conversion circuit; a drive module for the power conversion circuit; a current detection module; a voltage detection module; an input and output module; and a direct current regulated power supply.

The microcontroller is connected to the drive module, the current detection module, the voltage detection module and the input and output module, respectively. The power conversion circuit is connected to the three-phase switched reluctance motor, the drive module, the current detection module and the voltage detection module.

The microcontroller is configured to send a control signal to the power conversion circuit through the drive module, and respectively output a chopping current and a high-frequency pulse to a conducting phase winding and a non-conducting phase winding of the three-phase switched reluctance motor through the power conversion circuit. The microcontroller is also configured to calculate the rotor position angle of the three-phase switched reluctance motor according to a feedback signal of voltage and current detected by the voltage detection module and the current detection module.

The drive module is configured to receive the control signal of pulse width modulation (PWM) output by the microcontroller, and output a corresponding control signal to control a switching state of a corresponding power switch in the power conversion circuit.

The current detection module is configured for real-time detection of a current of each phase of the three-phase switched reluctance motor in the power conversion circuit.

The voltage detection module is configured for real-time detection of a voltage of each phase of the three-phase switched reluctance motor in the power conversion circuit.

The power conversion circuit is configured to receive the control signal output by the power conversion circuit drive module, and output a chopping current to the conducting phase winding of the three-phase switched reluctance motor and a high frequency pulse to the non-conducting phase winding, respectively.

The input and output module is configured to set control parameters of the three-phase switched reluctance motor and display state parameters such as speed and position angle of the rotor.

The direct current regulated power supply is configured to provide a voltage and a current to a system in normal operation.

The above-mentioned embodiments are preferred embodiments, and not intended to limit the present disclosure. Any variations, alternatives and modifications without departing from the spirit of the present disclosure should fall in the scope of the appended claims.

What is claimed is:

1. A sensorless control method for a three-phase switched reluctance motor, comprising:
    S1) obtaining phase inductances according to real-time phase inductances of three-phase windings of the three-phase switched reluctance motor;
    S2) dividing an electrical cycle of the three-phase switched reluctance motor into three conduction regions with a same electrical angle, and obtaining line inductances in a corresponding conduction region according to the phase inductances obtained in step S1 of the three-phase windings;
    S3) determining feature points of line inductances of three phases according to the line inductances obtained in step S2; calculating a position angle and a time interval of a region corresponding to the feature points of two adjacent line inductances; and calculating an average rotation speed $\overline{\omega_n}$ of a rotor in the region corresponding to the feature points of the two adjacent line inductances according to the position angle and the time interval of the region;
    S4) calculating a position angle $\theta_{n+1}(t)$ of the rotor at any time t in a next corresponding region according to the average rotation speed $\overline{\omega_n}$ of the rotor obtained in step S3 in the corresponding region; and
    S5) outputting a control signal to the three-phase switched reluctance motor according to the position angle of the rotor obtained in step S4, so as to realize a precise sensorless control for the three-phase switched reluctance motor.

2. The sensorless control method of claim 1, wherein the real-time phase inductance in step S1 is calculated as follows:
    operating the three-phase switched reluctance motor in a single-phase sequential cyclic conduction mode;
    controlling a power conversion circuit to inject a pulse voltage with a certain frequency into each phase winding; and detecting a difference of a slope of a phase current and a direct-current bus voltage of each phase winding in real time; and calculating the inductance of each phase winding according to formula (1):

$$L = \frac{2u_{dc}}{\Delta i} \quad (1)$$

wherein the $u_{dc}$ is the direct-current bus voltage; and the $\Delta i$ is the difference of the slope of the phase current between a turn-on and a turn-off of a switch tube.

3. The sensorless control method of claim 2, wherein in step S4, according to the average rotation speed of the rotor $\overline{\omega_n}$ obtained in step S3 in a region n, the position angle $\theta_{n+1}(t)$ of the rotor at any time t in the next corresponding region (n+1) is calculated by the following formula:

$$\theta_{n+1}(t) = \theta_{n+1}(t_0) + \overline{\omega_n}(t-t_0) \quad (23)$$

wherein $\theta_{n+1}(t)$ represents the position angle of the rotor at any time t in the region (n+1), and $\theta_{n+1}(t_0)$ represents the position angle of the rotor at a starting time $t_0$ of the region (n+1).

4. The sensorless control method of claim 1, wherein the step S1 comprises:
in an electrical cycle of the rotor of the three-phase switched reluctance motor, detecting a corresponding direct-current bus voltage and a difference of a slope of a phase current at different rotor position angles $\theta_k$ selected at a same time interval, respectively;
calculating a corresponding inductance $L_k$ according to the formula (1) to obtain n groups of parameters ($\theta_k$, $L_k$) (k=1, . . . n); and
according to the n groups of parameters, obtaining the phase inductions of the three-phase windings:

$$L_A(\theta_e) = B_1(i) + B_2(i)\cos\theta_e + B_3(i)\cos 2\theta_e \quad (2)$$

$$L_B(\theta_e) = B_1(i) + B_2(i)\cos(\theta_e - 2\pi/3) + B_3(i)\cos 2(\theta_e - 2\pi/3) \quad (3)$$

$$L_C(\theta_e) = B_1(i) + B_2(i)\cos(\theta_e + 2\pi/3) + B_3(i)\cos 2(\theta_e + 2\pi/3) \quad (4)$$

wherein $L_A(\theta_e)$, $L_B(\theta_e)$, $L_C(\theta_e)$ represent the phase inductances of A, B, and C phase windings of the three-phase switched reluctance motor, respectively; $\theta_e$ represents an electrical angle of the rotor; and $B_1(i)$, $B_2(i)$ and $B_3(i)$ represent coefficients of the phase inductances.

5. The sensorless control method of claim 1, wherein the step S2 comprises:
defining a difference between the inductances of two adjacent phase windings of the switched reluctance motor as a line inductance of the two adjacent phase windings;
in an electrical cycle of the rotor of the three-phase switched reluctance motor, dividing the electrical cycle into a first conduction region, a second conduction region and a third conduction region with the same electrical angle; and the line inductances corresponding to the three-phase switched reluctance motor are represented as follows:

$$L_{AB}(\theta_e) = L_A(\theta_e) - L_B(\theta_e) \quad (6)$$

$$L_{BC}(\theta_e) = L_B(\theta_e) - L_C(\theta_e) \quad (7)$$

$$L_{CA}(\theta_e) = L_C(\theta_e) - L_A(\theta_e) \quad (8)$$

wherein $L_{AB}(\theta_e)$ represents the line inductance between the A and B phase windings of the switched reluctance motor; $L_{BC}(\theta_e)$ represents the line inductance between the B and C phase windings; and $L_{CA}(\theta_e)$ represents the line inductance between the C and A phase windings.

6. The sensorless control method of claim 5, wherein in step S2, the line inductances of the three-phase switched reluctance motor in the first conduction region of an electrical cycle are represented as follows:

$$L_{Ab}(\theta_e) = [B_1(I) - B_1(i)] + [B_2(i)\cos(\theta_e) - B_2(i)\cos(\theta_e - 2\pi/3)] + \\ [B_3(I)\cos2(\theta_e) - B_3\cos2(\theta_e - 2\pi/3)] \quad (9)$$

$$L_{bc}(\theta_e) = \sqrt{3} B_2(i)\cos(\theta_e - \pi/2) + \sqrt{3} B_3(i)\cos(2\theta_e + \pi/2) \quad (10)$$

$$L_{cA}(\theta_e) = [B_1(i) - B_1(I)] + [B_2(i)\cos(\theta_e + 2\pi/3) - B_2(I)\cos(\theta_e)] + \\ [B_3(i)\cos2(\theta_e + 2\pi/3) - B_3(I)\cos2(\theta_e)] \quad (11)$$

wherein the A phase is a conducting phase, and the B and C phases are non-conducting phases.

7. The sensorless control method of claim 5, wherein in step S2, the line inductances of the three-phase switched reluctance motor in the second conduction region of an electrical cycle are represented as follows:

$$L_{aB}(\theta_e) = [B_1(i) - B_1(I)] + [B_2(i)\cos(\theta_e) - B_2(I)\cos(\theta_e - 2\pi/3)] + \\ [B_3(i)\cos2(\theta_e) - B_3(I)\cos2(\theta_e - 2\pi/3)] \quad (12)$$

$$L_{bC}(\theta_e) = \\ [B_1(I) - B_1(i)] + [B_2(i)\cos(\theta_e - 2\pi/3) - B_2(i)\cos(\theta_e + 2\pi/3)] + \\ [B_3(I)\cos2(\theta_e - 2\pi/3) - B_3(i)\cos2(\theta_e + 2\pi/3)] \quad (13)$$

$$L_{ca}(\theta_e) = \sqrt{3} B_2(i)\cos(\theta_e + 5\pi/6) + \sqrt{3} B_3(i)\cos(2\theta_e - 5\pi/6) \quad (14)$$

wherein the B phase is a conducting phase, and the A and C phases are non-conducting phases.

8. The sensorless control method of claim 5, wherein in step S2, the line inductances of the three-phase switched reluctance motor in the third conduction region of an electrical cycle are represented as follows:

$$L_{ab}(\theta_e) = \sqrt{3} B_2(i)\cos(\theta_e + \pi/6) + \sqrt{3} B_3(i)\cos(2\theta_e - \pi/6) \quad (15)$$

$$L_{bC}(\theta_e) = [B_1(i) - B_1(I)] + \\ [B_2(i)\cos(\theta_e - 2\pi/3) - B_2(I)\cos(\theta_e + 2\pi/3)] + \\ [B_3(i)\cos2(\theta_e - 2\pi/3) - B_3(I)\cos2(\theta_e + 2\pi/3)] \quad (16)$$

$$L_{Ca}(\theta_e) = [B_1(I) - B_1(i)] + [B_2(I)\cos(\theta_e + 2\pi/3) - B_2(i)\cos\theta_e] + \\ [B_3(I)\cos2(\theta_e + 2\pi/3) - B_3(i)\cos2\theta_e] \quad (17)$$

wherein the C phase is a conducting phase, and the A and B phases are non-conducting phases.

9. The sensorless control method of claim 1, wherein in step S3, the position angle of the region corresponding to the feature points of two adjacent line inductances is:

$$\Delta\theta_n = \frac{\Delta\theta_e}{N_r} \quad (21)$$

wherein $\Delta\theta_n$ represents the position angle of the region corresponding to the feature points of the two adjacent line inductances; $\Delta\theta_e$ represents the electrical angle of a region n corresponding to the feature points of the two adjacent line inductances; $N_r$ represents a number of a rotor pole of the three-phase switched reluctance motor.

10. A control apparatus for the sensorless control method of claim 1, comprising:
- a microcontroller;
- a power conversion circuit;
- a drive module for the power conversion circuit;
- a current detection module;
- a voltage detection module;
- an input and output module; and
- a direct current regulated power supply;

wherein the microcontroller is connected to the drive module, the current detection module, the voltage detection module and the input and output module, respectively; the power conversion circuit is connected to the three-phase switched reluctance motor, the drive module, the current detection module and the voltage detection module;

the microcontroller is configured to send a control signal to the power conversion circuit through the drive module, and respectively output a chopping current and a high-frequency pulse to a conducting phase winding and a non-conducting phase winding of the three-phase switched reluctance motor through the power conversion circuit; the microcontroller is also configured to calculate the rotor position angle of the three-phase switched reluctance motor according to a feedback signal of voltage and current detected by the voltage detection module and the current detection module;

the drive module is configured to receive the control signal of pulse width modulation (PWM) output by the microcontroller, and output a corresponding control signal to control a switching state of a corresponding power switch in the power conversion circuit;

the current detection module is configured for real-time detection of a current of each phase of the three-phase switched reluctance motor in the power conversion circuit;

the voltage detection module is configured for real-time detection of a voltage of each phase of the three-phase switched reluctance motor in the power conversion circuit;

the power conversion circuit is configured to receive the control signal output by the power conversion circuit drive module, and output a chopping current to the conducting phase winding of the three-phase switched reluctance motor and a high frequency pulse to the non-conducting phase winding, respectively;

the input and output module is configured to set control parameters of the three-phase switched reluctance motor and display state parameters such as speed and position angle of the rotor; and the direct current regulated power supply is configured to provide a voltage and a current to a system in normal operation.

* * * * *